US008290282B2

(12) United States Patent
Loiseau et al.

(10) Patent No.: US 8,290,282 B2
(45) Date of Patent: Oct. 16, 2012

(54) METHOD FOR REDUCING THE SIZE OF A DIGITAL IMAGE OR VIDEO FILE

(75) Inventors: Pascale épouse Gervais Loiseau, Paris (FR); Than Marc Eric Gervais, Paris (FR)

(73) Assignee: I-CES (Innovative-Compression Engineering Solutions), Paris (FR)

( * ) Notice: Subject to any disclaimer, the term of this patent is extended or adjusted under 35 U.S.C. 154(b) by 1328 days.

(21) Appl. No.: 11/658,180

(22) PCT Filed: Jul. 23, 2004

(86) PCT No.: PCT/FR2004/001985
§ 371 (c)(1), (2), (4) Date: Jan. 23, 2007

(87) PCT Pub. No.: WO2006/021625
PCT Pub. Date: Mar. 2, 2006

(65) Prior Publication Data
US 2008/0292198 A1    Nov. 27, 2008

(51) Int. Cl.
*G06K 9/36* (2006.01)

(52) U.S. Cl. .................. 382/232; 382/243; 375/240.01; 375/E7.2

(58) Field of Classification Search .................. 382/232
See application file for complete search history.

(56) References Cited

U.S. PATENT DOCUMENTS 5,488,672 A   1/1996 Mita
6,075,902 A   6/2000 Kojima

FOREIGN PATENT DOCUMENTS

GB    2 238 928    6/1991

OTHER PUBLICATIONS

Heckbert: "Color image quantization", ACM pp. 297-307, 1982.*
Tekalp Murat A Ed, "Digital Video Processing", "DPCM and Transform Coding", Prentice Hall Signal Procesing Series, Upper Saddle River, NJ: Prentice Hall, US, 1995 pp. 368-373.

* cited by examiner

*Primary Examiner* — Matthew Bella
*Assistant Examiner* — Ruiping Li
(74) *Attorney, Agent, or Firm* — Browdy Neimark, PLLC

(57) ABSTRACT

The invention concerns a method comprising a coding step consisting in replacing the original values of the file with coding values of reduced brightness, a common coding value being attributed to a group of original values, a step of restitution consisting in setting correspondence values between the coding value and the restored value, selected from one of the values of the corresponding group, an insertion step consisting in modifying the successive redundant restored values so as to produce shades and a step which consists in reading the values resulting from the insertion step.

8 Claims, 3 Drawing Sheets

FIG 3

METHOD FOR REDUCING THE SIZE OF A DIGITAL IMAGE OR VIDEO FILE

BACKGROUND OF THE INVENTION

1. Field of the Invention

This invention relates to a method for reducing the size of a digital file and for reading the file thus reduced. It is more particularly applicable to digital image or video files for which the digital data are compressed or not compressed or that may have to be compressed after reduction.

It is particularly aimed at reducing the scale of digital values transmitted to the encoder, for example up to $\frac{1}{5}°$ of the original scale represented by its 51 lowest brightness values.

In the case of decoding, these 51 reduced brightness values are reproduced on a larger scale in which the values are separated into sets of 5 and are calibrated from 3 to 253, only inducing an average error of 1% from the original data.

2. Description of the Prior Art

Conventionally, digital data are translated by numbers encoded on a scale from 0 to 255. In the context of a fixed length binary coding, the highest number being used as a reference, each character is coded on eight bits. In the context of a variable length binary coding, the allocation of bits refers to the probability of occurrence of each character, without taking account of the height of the characters. However, the efficiency of this coding depends on the number of values to be coded and the total length of the character string to be compressed.

To overcome this problem and thus reduce the number of bits used, existing compression systems record variations that characterize the pitch separating two or more values. Although this option tends to reduce their height, it often extends their range and does not provide a perfect answer to the problem because variations depend on the maximum difference between the original digital values of which they are only the translation.

More generally, a greater reduction in the size of a digital audio and video file traditionally makes it necessary to respect four constraints, the first and last of which are antinomic:
  reduce the number of values to be encoded,
  reduce the extent of their range,
  reduce the length of the character string,
  keep as much information as possible to guarantee a reproduction as similar as possible to the original.

OBJECT OF THE INVENTION

In particular, the purpose of the invention is to overcome the problems that arise with increased optimisation of the compression ratio of previously compressed or not compressed digital data without introducing any additional perceptible quality degradation.

SUMMARY OF THE INVENTION

To achieve this, it proposes a method including the following steps:
  an encoding step, including replacement of the original values by reduced brightness coding values within a predetermined scale, the same encoding value being assigned to a group of original values within a reduced space of values,
  a reproduction step comprising production of correspondence values between the coding value and a restored value chosen from among one of the values of the corresponding group so as to obtain the most refined possible reproduction,
  an addition step consisting of modifying the restored redundant successive values so as to make shades appear,
  a step to read values output from the addition step.

Advantageously,
  reduced brightness encoding values are included within a scale extending up to 51 or even up to 127 for original values of between 0 and 255,
  each reproduced value is equal to the median value of a corresponding group of original values,
  values reproduced during the addition step are modified taking account of the number of successive redundancies contained in each group of restored values.

In the case of compression of a digital file relating to colour images, the method according to the invention also comprises prior separation of digital values corresponding to each of the fundamental colour layers and separate processing of values corresponding to these layers. The fact that the colour layers are processed separately means that the number of successive redundancies and therefore the number of different values can be reduced during the coding phase, and then the number of colour combinations can be increased during the addition phase (in comparison with conventional methods).

It is found that the method according to the invention sets up a principle of concentration of data in the original file, the values of which are only represented by the first 51 digital values (from 1 to 51 or from 0 to 50). These are frozen on a scale of 1 to 51 or 0 to 50, replacing the 256 potential traditional values. The method according to the invention reduces the number of values to be encoded by 80%. In the same way, the method according to the invention also reduces the extent of the range of values transmitted to the encoder within the same proportion. The combination of the reduction of the number of values to be coded and the reduction of their extent de facto results in a reduction in the size of the coded file.

Thus, in the context of a fixed length binary coding, the highest value is used as a reference and is equal to 51, so that each character is coded on six bits instead of eight bits in the traditional system. There is then a bit saving equal to 25%.

In the context of the variable length binary encoding, the efficiency of this binary coding is reinforced by the method that reduces the maximum range of values to be encoded by a factor of five: the least frequent occurrence is coded at 7 bits maximum compared with 9 bits in the current system. Finally, the method according to the invention also optimises coding the variations because it reduces the potential difference between the lowest value and the highest value by a factor of five, and consequently condenses the range of variations, for which the distances potentially vary from −50 to 50 instead of the traditional value from −255 to 255.

Moreover, one advantage of the method according to the invention is that it reduces the length of the character string. It encourages an increase in the time and space redundancy ratio. By working on only 51 values, the method reduces the number of isolated colour combinations to be transmitted to the coder. On the other hand, the method leads to the creation of additional redundancies. Therefore, it enables known algorithms to deliver higher compression ratios, because the method gives a file for which digital data can be better optimised.

Another advantage of this method is that, despite the reduction in the number of items of information, it does not lead to any perceptible additional quality degradation compared with the quality of the compressed or non-compressed source. The choice of the process to represent values of the file to be coded only by its first 51 values lies in its capacity to only generate a low error coefficient during the information reproduction phase, based on the proximity and complementarity criteria.

proximity: the reproduced value is only shifted from its original value by −2 to +2. The average error coefficient is of the order of 1%. Since the values are similar, the loss of information is imperceptible.

complementarity: the process allows for a modification to unique data ranges by a complementary addition of data applied on even information ranges as a function of the repetition of the number of successive identical data found in the transformed file.

The method is adapted to any digital image and video file containing previously compressed or raw data:

either it is used as an enhanced reduction mechanism for the size of digital data optimising compression factors of known encoding systems. It then modifies the uncompressed source on which the system will act. At this stage, the method behaves like a processing module of a source that will be encoded by compression systems for which the method can be used to enable better optimised functions.

or it acts as a complement to reduce the size of a previously encoded file. It then modifies the compressed file. It then behaves like a post-compression module and is defined as an overcompression tool designed to reduce the size of a previously compressed digital file.

This method includes an adapted image and/or video reader, enabling display of the digital file optimised by the invention and enabling reproduction of a better quality of even data ranges and/or production of less pronounced transitions between blocks when processing one or more images, by application of the reproduction mechanism by complementarity in order to reduce artefact and pixelisation phenomena.

BRIEF DESCRIPTION OF THE DRAWINGS

One embodiment of the method according to the invention will be described below as a non-limitative example with reference to the appended figures, wherein:

FIG. 3 is a synoptic diagram illustrating steps in the method.

DESCRIPTION OF THE PREFERRED EMBODIMENTS

Figure 1:
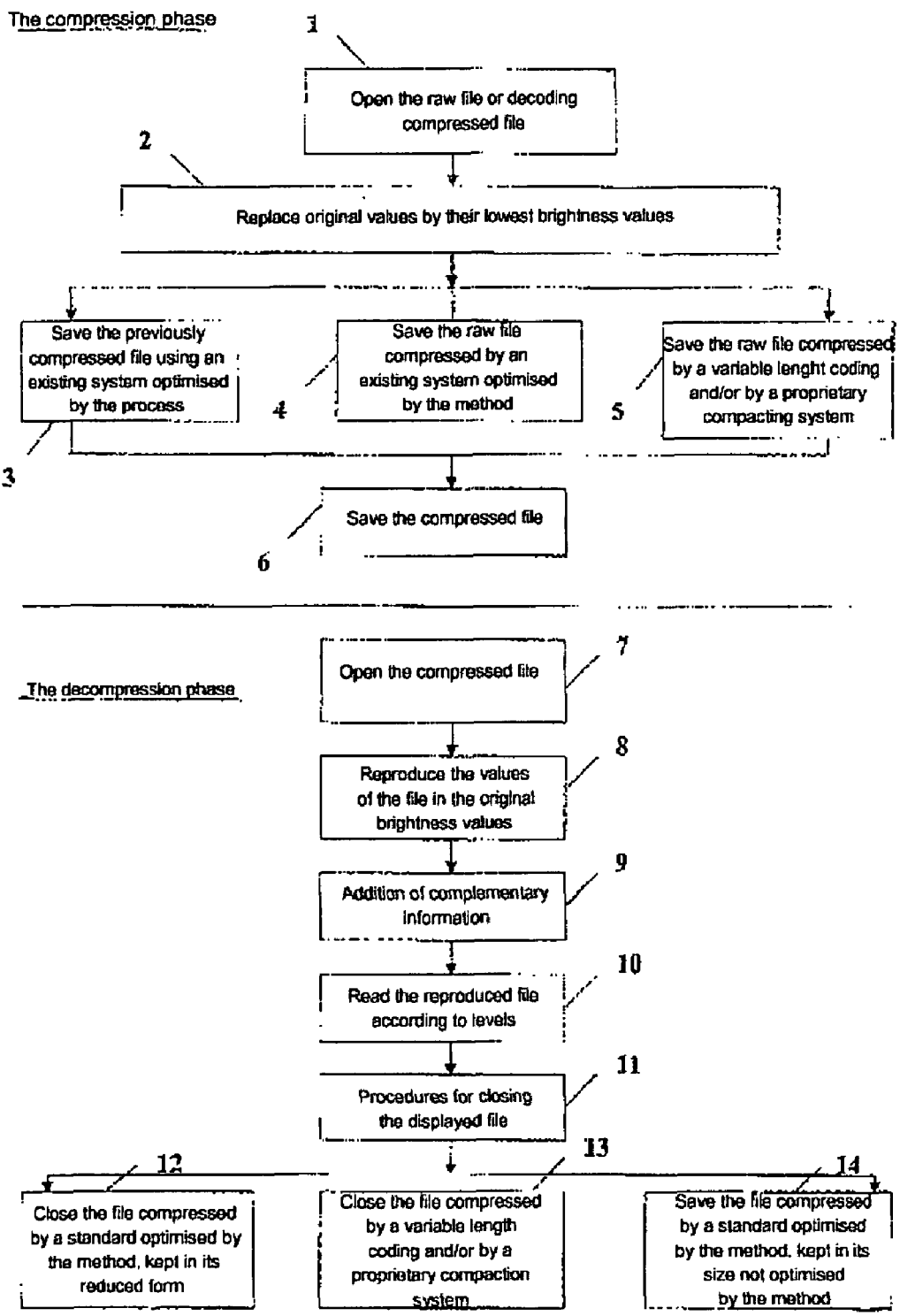
FIG. 1 is a theoretical diagram showing the principle of the method according to the invention.

As illustrated in FIG. 1, the method of processing values of digital data for a source comprises a compression phase on the values of digital data and a decompression phase, in sequence.

A/ The compression phase of the values of digital data comprises four steps:

1. a file opening phase (block 1) to distinguish between an uncompressed source or a file compressed using an existing "Jpeg" type compression system, 2. a replacement phase (block 2) of the original values by their corresponding brightness values reduced according to a reduction scale that can be defined from 1 to 51 or even up to 127, depending on the required degree of quality, 3. a phase to reduce the size of the file processed by the method that includes three possibilities: reduction of the file already compressed by the compression system that has already reduced it (block 3) and that the process optimises, reduction of the uncompressed file by an existing compression system (block 4) that the method optimises, and reduction of the uncompressed file by a proprietary compression format (block 5), 4. a phase to save the compressed file (block 6).

B/ The decompression phase includes five steps:

1. open the compressed file by the decoder that acts as a reader (block 7), 2. a phase to restore the compressed file with its original brightness levels according to parameters to reduce the brightness scale used during the compression phase of the compressed or uncompressed file (block 8), 3. a phase for addition of complementary information that provides the image or images with a larger number of combinations of grey shades or colour shades per RGB and/or CMYB layer, in order to restore the largest possible number of shades (block 9), 4. a phase to read the decompressed file enriched by the reader, that displays the image or images in their original brightness levels (block 10), 5. procedures to close the displayed file (block 11) that provide three possibilities: save the compacted file compressed by an existing compression standard optimised by the method (block 12), save the compacted file with its reduced size compressed file by a proprietary format (block 13) and save the file compressed by an existing compression standard and reproduced in its original brightness levels stored at the size that it would have had if it had not been optimised by the method (block 14).

Figure 2:
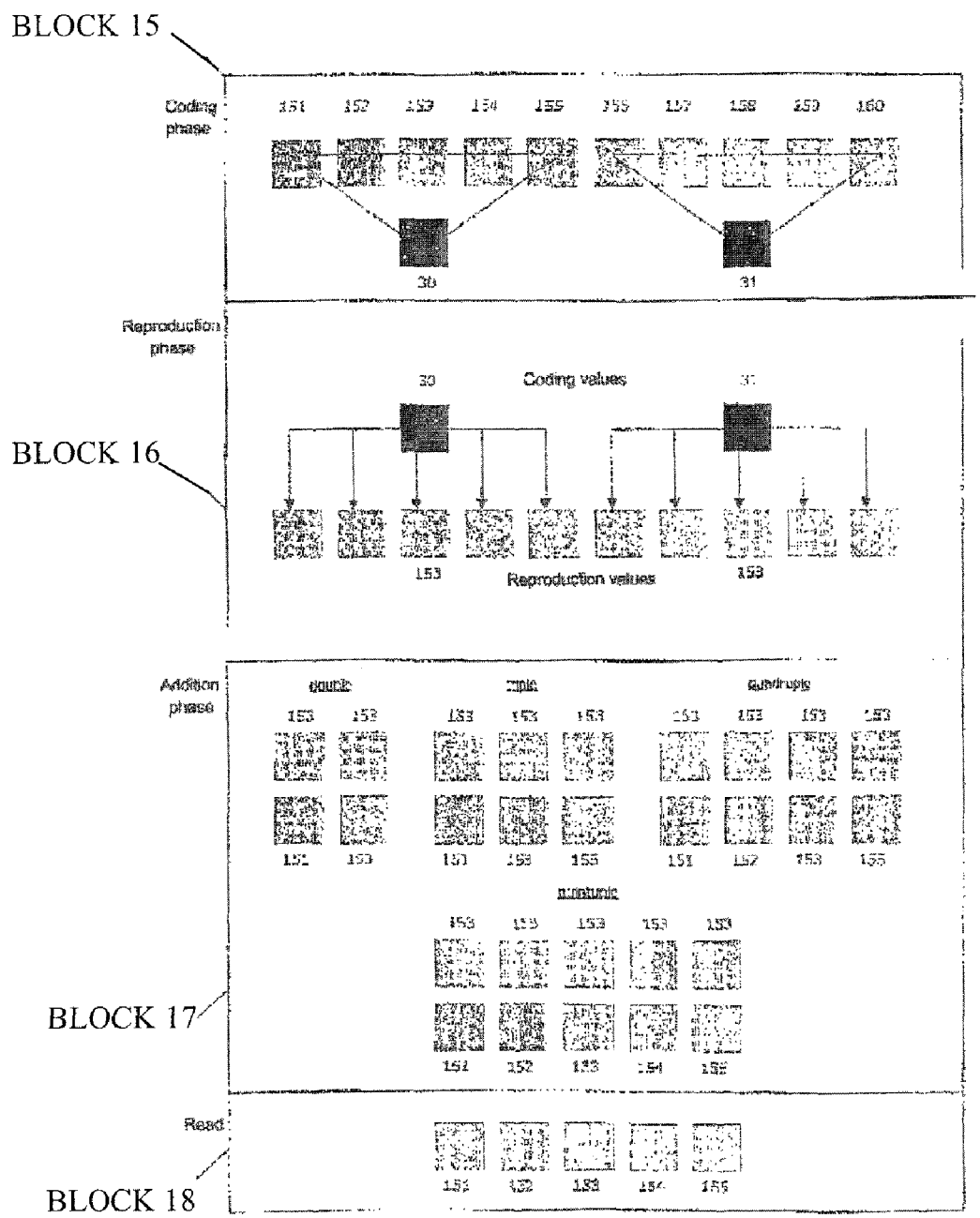
FIG. 2 is a table of values showing the reduction and widening of scales of values.

FIG. 2 shows an example of a treatment phase of the values of digital data of the source illustrated by four blocks: the coding phase (block 15), the reproduction phase (block 16), the addition phase (block 17) and the read phase (block 18).

a) Coding phase: block 15 illustrates the example of a series of original values graduated one by one, representing the numbers 151 to 160. The series is broken down into two groups of values, from 151 to 155 and from 156 to 160. A predetermined coding value corresponds to each of these groups. The number 30 illustrates the group 151 to 155, and the number 31 defines the group 156 to 160. The block 15 represents an example coding of values 151 to 160 by their lowest corresponding and predetermined values 15.

b) Reproduction phase: block 16 represents the reproduction phase of the predetermined coding values of the groups 151 to 155 and 156 to 160: 30 becomes 153 and 31 becomes 168. This represents a modification to the brightness of the restored value, which is the inverse phase of the representation of the original values by their corresponding predetermined lowest values. The number 153 represents the values 151, 152, 153, 154 and 155. The number 158 represents the values 156, 157, 158, 159 and 160. The difference between the reproduced values and the original values 16 is not more than −2 to +2.

c) Addition phase: block 17 represents the addition phase that will create additional colour grades as a function of the number of successive double, triple, quadruple and quintuple redundant values. The addition principle is governed by the following rules:

double: −2 and 0. For example, 153 and 153 becomes 151 and 153, triple: −2, 0, +2. For example, 153, 153 and 153 becomes 151, 153 and 155, quadruple: −2, −1, 0 and +2. For example, 151, 152, 153 and 155, quintuple: −2, −1, 0, +1, +2. For example, a quintuple of 153 becomes 151, 152, 153, 154 and 155.

d) Read phase: block 18 represents an example reading of reproduced values.

Figure 3:
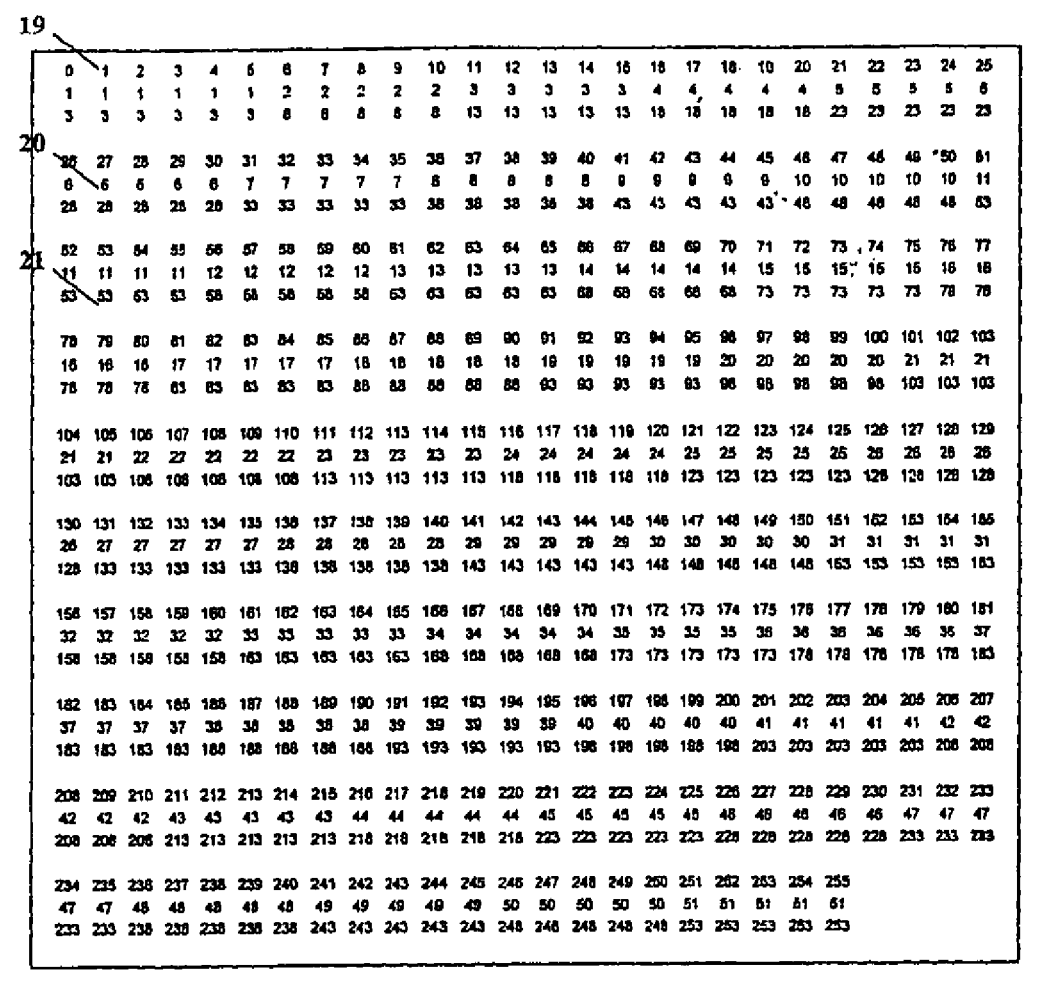

FIG. 3 represents the table of original values, values of reduced brightness and reproduced values. The first rank 19 of the ten groups of values represent the original values. The second rank 20 represents reduced brightness values and the third rank 21 in each group of values illustrates reproduced values for which the difference between the reproduced value and the original value 16 is never more than −2 to +2, representing an error of less than 1%.

The method according to the invention has the advantage of optimising data compression for existing or future software or hardware encoders and decoders. It is adapted to any hardware that already receives digital data compacted by known compression systems or any hardware suitable for broadcasting digital image or video files using a known or future coding.

The invention claimed is:

1. A method for reducing the size of a digital file comprising at least one of compressed or uncompressed digital values, wherein the digital values are encoded in an original brightness scale from 0 to 255 for each color layer, comprising:
    converting successive values of an original file into successive original groups of values, each group being identified by an original median value of values in the successive original group of values,
    replacing the original median values by reduced brightness coding values within a predetermined reduced brightness scale smaller than the original brightness scale,
    replacing each coding value by a reproduced group having values equal to the original median value corresponding to said coding value,
    modifying a plurality of successive redundant reproduced values to output a plurality of modified values, depending on how many successive redundant values are contained in each group of reproduced values, according to the following rules:
        if a redundant value appears two times, add −2 and 0 to the successive redundant values to obtain the plurality of modified values,
        if a redundant value appears three times, add −2, 0 and +2 to the successive redundant values to obtain the plurality of modified values,
        if a redundant value appears four times, add −2, −1, 0, and +2 to the successive redundant values to obtain the plurality of modified values,
        if a redundant value appears five times, add −2, −1,0, +1 and +2 to the successive redundant values to obtain the plurality of modified values, and—,
    reading the obtained plurality of modified values.

2. The method according to claim 1, wherein the step of replacing the original median values uses a scale extending from one of 0 to 51 or from 0 to 127 to replace original values between 0 and 255.

3. The method according to claim 1, wherein when the digital file includes colour images, also comprising a step of, prior to the step of converting, separating the digital values corresponding to each of a plurality of fundamental colour layers and separately processing values corresponding to each of the plurality of fundamental colour layers.

4. The method according to claim 1, wherein for fixed length binary coding, a highest value is used as a reference and is equal to one of 51 or 127, so that each character is coded on only six bits or seven bits.

5. The method according to claim 1, comprising, during the step of replacing each coding value, a step of making modifications to unique data ranges by a complementary addition of data applied on even information ranges as a function of repetition of a number of successive identical data found in the transformed file.

6. The method according to claim 1, wherein the digital files originate from a source that will be encoded by existing or future compression systems, and said method behaves as a preprocessing module for said source.

7. The method according to claim 1, further comprising performing a function to make a complementary reduction to a size of previously encoded files and said method behaves as a post-compression module.

8. The method according to claim 1, wherein the digital file is one of a video file or an image file.

* * * * *